(12) United States Patent
Liu et al.

(10) Patent No.: US 12,055,381 B2
(45) Date of Patent: Aug. 6, 2024

(54) STRAIN GAUGE

(71) Applicant: Worcester Polytechnic Institute, Worcester, MA (US)

(72) Inventors: Yuxiang Liu, Worcester, MA (US); Hamed Jafarishad, Worcester, MA (US); Mucheng Li, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 359 days.

(21) Appl. No.: 17/669,042

(22) Filed: Feb. 10, 2022

(65) Prior Publication Data
US 2022/0252388 A1    Aug. 11, 2022

Related U.S. Application Data

(60) Provisional application No. 63/148,370, filed on Feb. 11, 2021.

(51) Int. Cl.
*G01B 11/16* (2006.01)

(52) U.S. Cl.
CPC .................. *G01B 11/16* (2013.01)

(58) Field of Classification Search
CPC ............ G01L 1/24; G01L 1/242; G01B 11/16
See application file for complete search history.

(56) References Cited

U.S. PATENT DOCUMENTS

| | | | |
|---|---|---|---|
| 5,649,035 A | 7/1997 | Zimmerman et al. | |
| 7,277,605 B2* | 10/2007 | Pocha | G01K 11/3213 385/94 |
| 8,326,095 B2 | 12/2012 | Hartog et al. | |
| 8,327,716 B2 | 12/2012 | Kreuzer et al. | |
| 2002/0159671 A1* | 10/2002 | Boyd | G01L 9/0079 385/12 |
| 2009/0202195 A1* | 8/2009 | Lagakos | G01L 9/0077 385/13 |

FOREIGN PATENT DOCUMENTS

EP    1816432 B1    11/2008

OTHER PUBLICATIONS

International Search Report, PCT/US2022/015977, May 19, 2022, pp. 1-2.

* cited by examiner

*Primary Examiner* — Roy M Punnoose
(74) *Attorney, Agent, or Firm* — Armis IP Law, LLC

(57) ABSTRACT

A strain gauge device employs a reflective base adapted to reflect a divergent optical signal, and a glass tube attached to the reflective base for optical communication therewith, the glass tube having a working length into which an optical fiber is inserted. The optical fiber is configured for transporting an optic signal indicative of the detected strain. The optic fiber has an outside diameter slightly smaller than an inside diameter of the glass tube for providing a slight tolerance. A distal end is disposed in slidable communication with an interior of the glass tube and accommodated by the tolerance, and a sensing circuit at the proximate end receives an optical signal indicative of strain or displacement. A resilient buffer layer made of soft silicone is disposed outside the glass tube to allow for large deformation measurements and reduce the distortion of the deformation by the introduction of the sensor.

20 Claims, 5 Drawing Sheets

STRAIN GAUGE

RELATED APPLICATIONS

This patent application claims the benefit under 35 U.S.C. § 119(e) of U.S. Provisional Patent App. No. 63/148,370, filed Feb. 11, 2021, entitled "OPTICAL FIBER STRAIN SENSOR," incorporated herein by reference in entirety.

BACKGROUND

Strain gauge devices are often employed for measuring forces imposed on rigid structures or assemblies based on surface characteristics of a member under strain from an external force. Typically, strain gauges take the form of a conductive material forming a repetitive pattern on the surface of the member to be measured. Applied external forces affect an electrical signal passed though the conductive material. Conventional strain gauges are developed for application to rigid, hard, and flat surfaced members under substantial force, and are often limited to measuring small strain or deformation. In practice, strain gauges often measure stress or fatigue on a generally static system by detecting minute surface variations and translating these to an electric signal.

SUMMARY

A strain gauge device employs a reflective base adapted to reflect a divergent optical signal, and a glass tube attached to the reflective base for optical communication therewith, the glass tube having a working length into which an optical fiber is inserted. The optic fiber has a proximate end and a distal end, such that the optical fiber is configured for transporting an optic signal indicative of the detected strain. The optic fiber has an outside diameter slightly smaller than an inner diameter of the glass tube for providing a slight tolerance. The distal end is disposed in slidable communication with an interior of the glass tube and accommodated by the tolerance, and a sensing circuit at the proximate end receives an optical signal indicative of strain or displacement.

A resilient buffer is concentrically disposed around the optic fiber and the glass tube, such that the buffer adheres to the glass tube and also adheres to a portion of the optical fiber extending from the glass tube. The resilient buffer is configured to dispose in response to an external strain, in which the external strain results in an advancement or retraction of the distal end within the working length of the glass tube. The advancement or retraction based on the strain results in a change to the divergent optical signal reflected from the reflective base as the tip of the proximate end is pulled away from the reflective base and allows more of the optical signal to diverge outside the optic fiber instead of being reflected back into the optic fiber.

Configurations herein are based, in part, on the observation that strain gauges are often employed for dense and heavy materials, typically for structural evaluation and integrity of substantial mass and significant imposed force. Minute changes in surface properties can be indicative of forces applied to rigid members with high density and mass, such as structural steel beams.

In contrast, configurations herein address a need for small strain sensors with large strain range for soft material such as foods and paper. The sensor can provide measurements in manufacturing as well as in point-of-care applications. In particular, there is a great need for strain measurements in the food and pulp & paper industries for the drying process control. It is advantageous that the sensor not only can measure a large strain range (~20%) but also can be implemented in environments with complex physical conditions and constraints including 1) presence of microwave, 2) high temperature (>300° C.), 3) small spaces (<3 mm), and 4) small samples (<1 cm).

Unfortunately, conventional strain gauges suffer from the shortcoming that most of the commercially available sensors rely on an electrical signal, and do not meet above-mentioned requirements. They require glue on rigid and flat surfaces to mount, with the surfaces often polished by sandpaper before glue application. They are limited in strain range (typically within <2%) and cannot provide faithful measurements on soft materials due to their stiff structures. In summary, they cannot be used for soft materials. A strain sensor based on a non-electrical sensing mechanism and with a large strain range for soft materials would be beneficial. The disclosed approach substantially overcomes these shortcomings with an optical strain gauge that is intrinsically immune to the electromagnetic interference and can withstand a high temperature environment.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The description below presents an example of the sensor combines an optical fiber-tip and mirror form factor with a soft structure, in contrast to conventional hard surfaced strain gauges. A soft silicone barrel provides an integrated sensory medium and can be readily fabricated outside the sensing element, which bestows the sensor a distinct benefit of an ability to measure a large strain range (>20%). Such a feature, combined with a molding fabrication method, results in a reliable and low-cost strain sensor readily embeddable in soft materials such as foods and paper for continuous strain measurements, for example.

Figure 1:
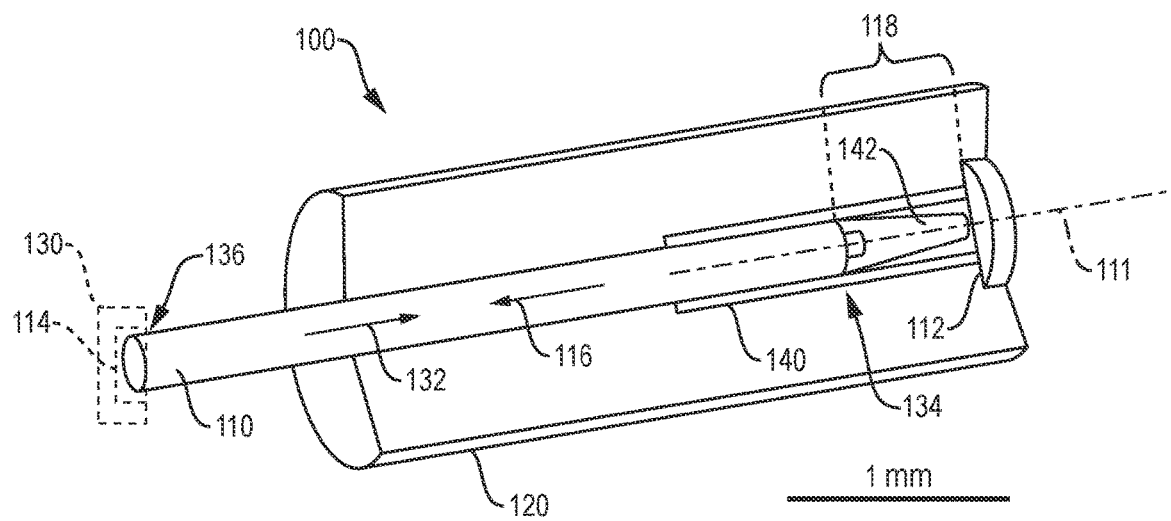
FIG. 1 is a perspective view of the fiber optical strain sensor device as disclosed herein.

FIG. 1 is a perspective view of the fiber optical strain sensor device as disclosed herein. Referring to FIG. 1, an optical fiber sensor device 100 include an optical fiber 110 disposed in proximity to a reflective surface 112. An interface 114 to an optical sensor receives an optical signal 116 reflected from the reflective surface 112. A sensory medium 120 engages with the optical fiber 110 and is configured to dispose the optical fiber at a distance 118 from the reflective surface 112 based on a sensed force applied to the sensory medium 120. A sensing circuit 130 computes a magnitude of the sensed force based on the reflected optical signal 116 from the optical fiber 110.

A sensing receptacle 142 embedded in the sensory medium 120 is defined by a transparent tube 140 or sleeve having translucent walls, and is adapted for slidable engagement with the optical fiber 110. The reflective surface 112 is disposed for intersection with an axis 111 of the optical fiber 110. The reflective surface 112 reflects a portion of light emitted from the optical fiber outside the transparent tube 140, and reflects a portion of light emitted from the optical fiber back into the optical fiber 110 to the sensing circuit 130 based on a distance 118 of a distal end 134 to the reflective surface 112.

Figure 2:
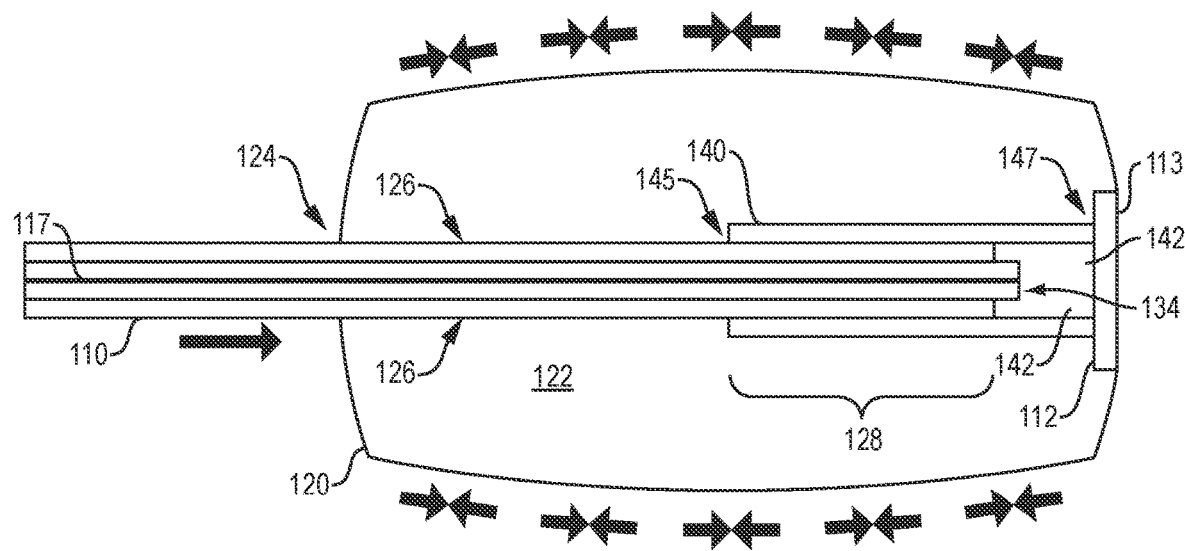
FIG. 2 is a side cutaway view of the sensor as in FIG. 1.

FIG. 2 is a side cutaway view of the sensor as in FIG. 1. Referring to FIGS. 1 and 2, an emitted sensing signal 132 is directed towards the reflective surface 112 via the optical fiber 110 at the distal end 134 of the optical fiber 110. The sensing receptacle 142 is formed from the transparent tube 140 having an open end 145 and a closed end 147 defined by the reflective surface 112 disposed at the closed end 147 of the transparent tube. The optical fiber 110 is inserted into the open end 145 of the transparent tube to the predetermined distance 118.

The surrounding sensory medium 120 further includes a shaped volume 122 of deformable material, and a bore 124 through the shaped volume. The transparent sleeve 140 is inserted in the bore 124, such that the transparent sleeve surrounds a detached portion 128 of the optical fiber. The bore 124 is appropriately sized for receiving the optical fiber 110 engaged with the receptacle 142. An attachment 126 or adhesion between the optical fiber 110 along a portion of the received optical fiber 110 provides a resilient fixation, while the detached portion 128 of the optical fiber 128 within the bore defines a variable distance from a distal end 134 of the optical fiber 110 to the reflective surface 110 from slidable movement of the optical fiber within the transparent tube 140. The transparent tune 140 may be any suitable shape that slidably engages the optical fiber 110, and the adhesive portion 126 may extend around the open end 145, discussed further bellow, to allow for a resilient, slidable engagement between the optical fiber 110 and the inner diameter of the tube 140.

Figure 3:
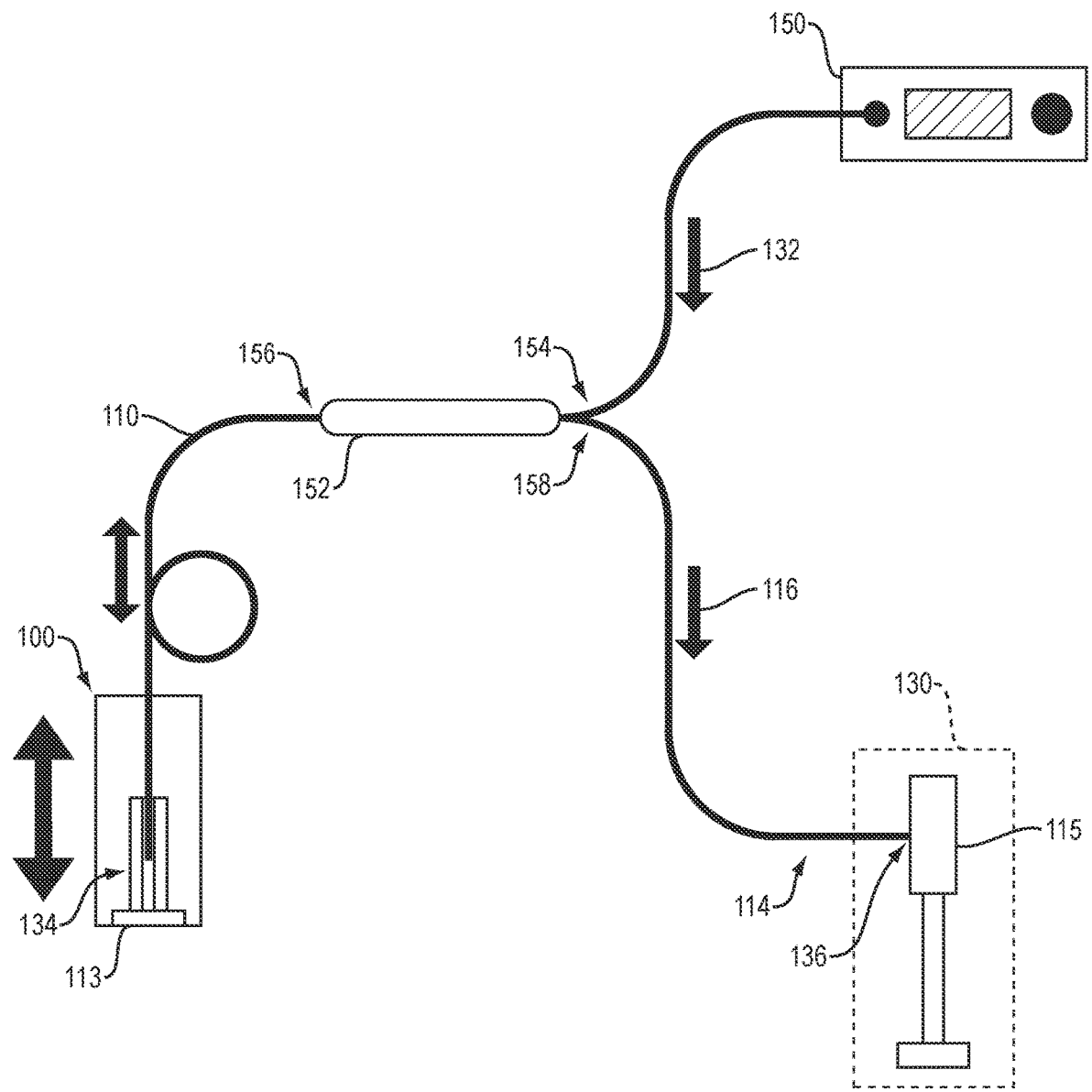
FIG. 3 is a system view of the sensor of FIGS. 1 and 2.

FIG. 3 is a system view of the sensor of FIGS. 1 and 2. Referring to FIGS. 1-3, in the disclosed sensor 100, the optical fiber 110 is chosen as a medium for both sending and receiving the signal. As depicted in FIGS. 1-3, the optical fiber distal end 134 (tip) is facing a metal disk 113 that has the reflective surface 112 acting as a mirror. Emitted light from the optical fiber 110 reflects and due to the divergence of light in free space, only a portion of the light goes back into the optical fiber 110. This provides an intensity modulated measurement of the distance between the distal end 134 of the fiber and the disk 113 through measuring of the intensity of the reflected light. As the distance between the tip of the fiber and disk increases, intensity of the reflected light reduces from increased reflected scattering of the signal 128 around the optical fiber, and less of the reflected optical signal 116 received back into the optical fiber 110.

FIG. 2 depicts the sensor 100 under a compressive or tension load. Based on the described measurement method it is significant that the fiber distal end 134 maintain an orientation perpendicular to the disk 113. The transparent sleeve 140 may be a glass tube, glued or adhered to the disk 113, to maintain the fiber axis 111 at a right angle to the disk 113 and reflective surface 112.

In an example configuration, the deformable material is a buffer layer of soft silicone rubber formed into the shaped volume 122 that covers the glass tube and a part of the optical fiber 110. The resilient nature of the silicone rubber provides a sensory medium 120 that acts as a spring and holds the optical fiber at a desired distance 118 from the disk 111 in a rest or undeformed position.

A further feature is a buffering effect. As the outer surface of the sensory medium deforms, due to its resilient property and fixation to to the optical fiber 110 and glass tube which are relatively much stiffer, only a portion of the deformation is transferred to the fiber. Therefore, a relative displacement between the optical fiber 110 and disk 113 is lower than the deformation on the outer surface of the sensory medium, thus increasing the strain range that the sensor 100 can detect. The claimed approach includes a silicon sensory medium adhered with silicon glue. Other resilient and/or deformable materials may be employed, and may have a varied stiffness or resiliency for fine tuning a sensitivity of the sensor 100.

Referring again to FIG. 3, and continuing to refer to FIGS. 1 and 2, the sensor assembly further includes a signal generator 150. The signal generator 150 is a light source that transmits the sensing signal 132 to the distal end 134 of the optical fiber 110. The sensing circuit 130 attached to the optical fiber 110 receives the reflected optical signal 116. A circulator 152 connects to the optical fiber 110 for directing the transmitted and received signals, which are supported bidirectionally by the optical fiber 110. The circulator 152 includes a source port 154 for receiving the sensing signal and directing the sensing signal to a second, sensory port 156 connected to the distal end 134. The sensory port 156 directs the sensing signal 128 towards the reflective surface 112, and also receives the reflected optical signal 116 for directing the reflected optical signal to the sensing circuit 130 via a measurement port 158. The sensing circuit 130 may process and map a voltage level of the photodetector 115 using a set of software instructions to a degree of strain or movement, shown below in FIGS. 6 and 7.

The resulting reflected optical signal 116 are indicative of a strain of a range of 0-20% of a host object to which the resilient buffer is inserted or affixed. Typically, the resilient buffer is formed from silicon having a cylindrical shape and a bore therethrough for accommodating the glass tube. The reflective base is adapted for insertion into a food product. Together, the resilient buffer, glass tube and reflective base form an assembly having a length between 2-4 mm and a width between 1-2 mm, and may be employed for insertion into or on the surface of a food item for detecting manufacturing characteristics as the food item is prepared, formed and/or heated.

Figure 4:
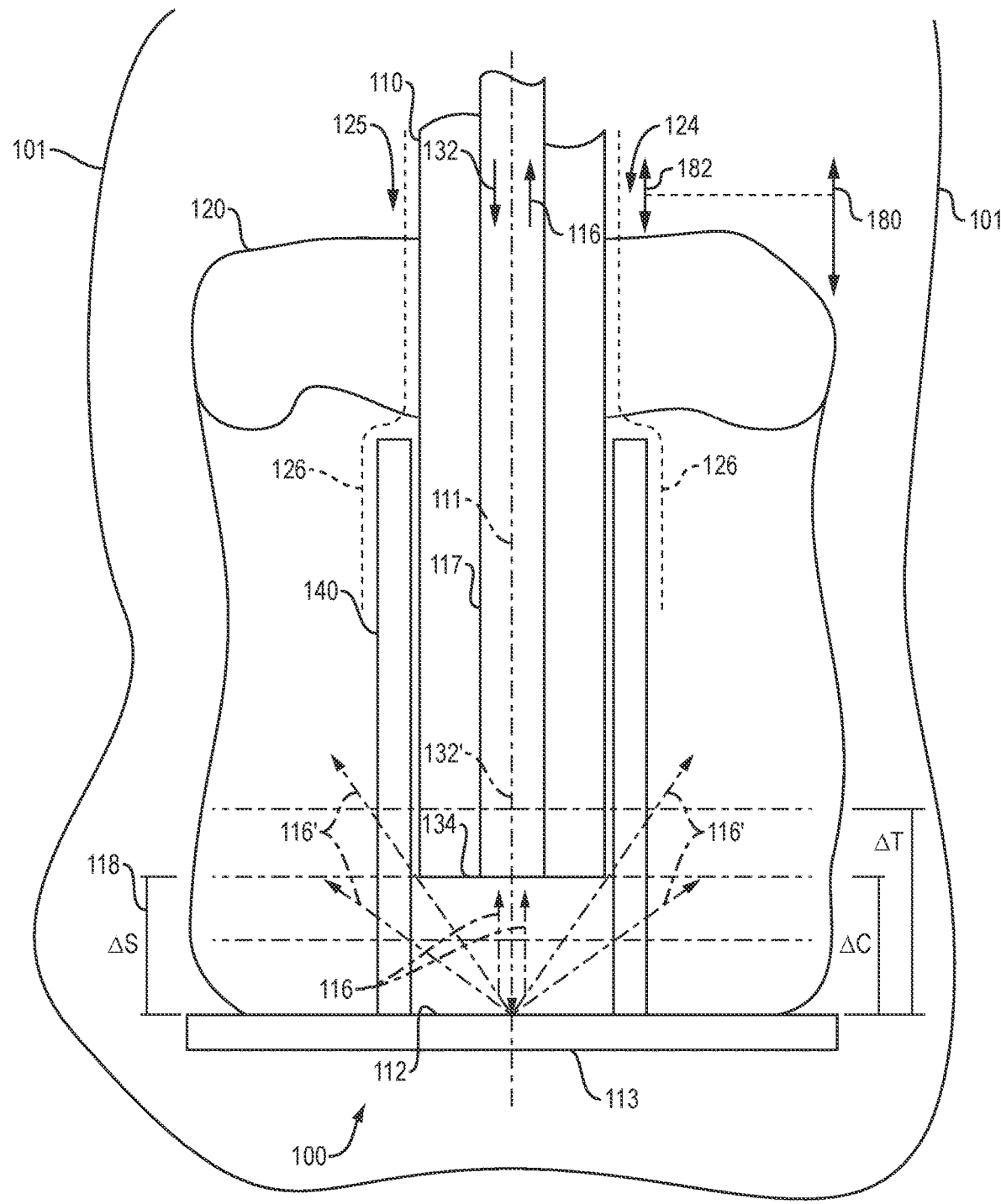
FIG. 4 shows operation of the sensor of FIGS. 1-3.
Figure 5A:
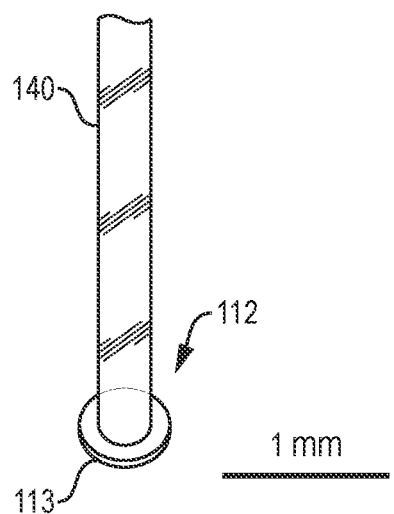
FIGS. 5A-5D show fabrication of the sensor of FIGS. 1-4.
Figure 5B:
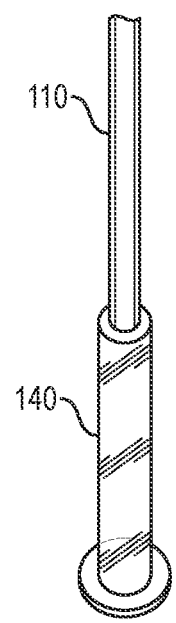
Figure 5C:
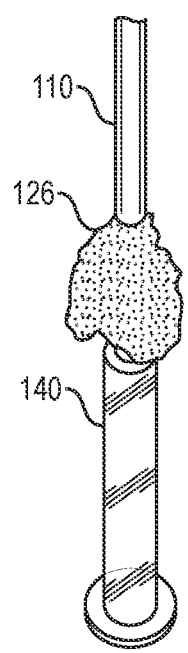
Figure 5D:
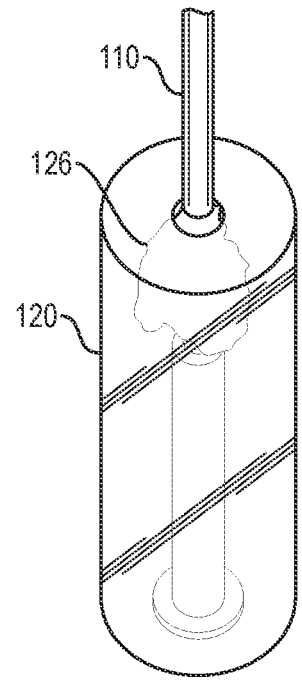

FIG. 4 shows operation of the sensor of FIGS. 1-3. Referring to FIGS. 1-4, the optical fiber 110 has a core 117 defining the axis 111, through which the optical signals travel. The sensory medium 120 and adhesion 126 form a structure that disposes the axis 111 substantially perpendicular to the reflective surface 112. The substantially perpendicular orientation provides that the reflective surface 112 is disposed at an angle to reflect at least a portion of light emitted from the optical fiber 110 back into the optical fiber as reflected optical signal 116. The distance 118 is based on a distal end 134 of the optical fiber and the reflective surface 112 when the sensing signal 128 is emitted from the distal end 134 of the optical fiber 110.

When the sensor 100 is at rest, a signal delta AS defines the distance 118 of the distal end 134 in proximity to the reflective surface 112. Concurrently, the sensing circuit 130 attaches to the proximate end 136 for receiving the reflected optical signal 116. The circulator 152 bifurcates the optical fiber 110 to differentiate the source of the sensing signal 132 and receipt of the reflected optical signal 116.

In operation, from the undeformed or start position defined by AS first, light from the light source 150 goes through the circulator 152 and into the sensor 100. The emitted light, shown by dashed arrows 132' reflects from the reflective surface 112 as dispersed reflected light 116' or as the reflected optical signal 116,' passing again into circulator 152, and finally, into the interface 114 for the photodetector 115 of the sensing circuit 130. As the distance of the fiber tip and metal disk changes, the intensity of the reflected light also changes which is measured by the photodetector 115.

For deployment, the sensor 100 is disposed in a sensing arrangement with a surface or medium 101, such as a prepared food. As external forces 180 from the sensed medium or body drive the sensory medium 120, a corresponding but buffered force 182 is transferred to the optical fiber 110, resiliently adhered in the deformable medium. The transferred force drives the distal end 134 either closer to the reflective surface 112, resulting in a distance indicative of a compression delta AC, or pulled farther away from a tensioning force, resulting in a distance for a tension delta AT. The resulting reflected signal 116 varies with the distance as a greater portion of the reflected light 116' falls outside the optical fiber as the distance 118 increases, thus reducing the intensity of the return signal 116.

FIGS. 5A-5D show fabrication of the sensor of FIGS. 1-4. Fabrication includes achieving a resilient, slidable communication between the optic fiber 110 and the transparent tube 140, moderated by the sensory medium 120. Formation of the optical sensor 100 includes attaching the transparent tube 140 perpendicular to the reflective disk 113. The transparent tube 140 may be glass or translucent for allowing a portion of reflected light to pass. In the example shown, the transparent tube 140 has an outer diameter of 360 μm and inner diameter of 250 μm and is glued to the reflective disk 113. The disk 113 has a reflective side 112, a diameter of 600 μm and thickness of 100 μm, however other dimensions may be employed.

The sensory medium 120 is formed from a small tube of silicone rubber and cut to a length to extend over an entry 125 of the optical fiber 110 into the transparent tube 140 and allow for the adhesive 126. The tube defines the bore 124, and the optical fiber 110 is passed through the bore and into the transparent tube 140. The optical fiber 110 has an outside diameter based on the interior diameter of the transparent tube, around 250 μm, to allow slidable communication within the tube 140. The optical fiber then passes through the buffer layer (sensory medium 120) before is aligned and inserted in the tube and kept at the desired distance 118 from the disk surface, around ~0.500 μm. surface. Then, silicone glue is applied to the open end 145 of the transparent tube 140, and after that, the buffer layer passed along the optical fiber 110 to cover the glass tube and the fiber. The silicone glue adheres a portion of the optical fiber 110 to the bore 124, such that a portion of the optical fiber inserted into the bore remains in slidable communication with an interior of the transparent tube 140. The silicone glue defines the adhesive 126 which, along with the sensory medium 120, forms the deformable shape 122 allowing resilient, slidable communication of the optical fiber 110 to vary the distance 118 from AC to AT.

The optical fiber 110 therefore employs a flexible connection to the formed resilient buffer and has a tolerance for slidable communication within the inside diameter of the glass tube. As the resilient buffer deforms in response to the strain, the adhered portion of the optical fiber responds in conjunction with the resilient buffer and disposes the tip a varied distance from the reflective base. Non metal components allow usage in microwave environments, as in food preparation contexts.

As shown in FIG. 3, the circulator 152 is attached to a proximate end of the optical fiber opposite the distal end inserted into the transparent tube. An optical source 150, such as a laser, LED (Light Emitting Diode) or other light source is attached to a port of the circulator 152 for communication with the distal end 134, and the sensor circuit 130 attaches to a port of the circulator 152 for receiving the reflected optical signal 116 from the reflective surface 112.

Figure 6:
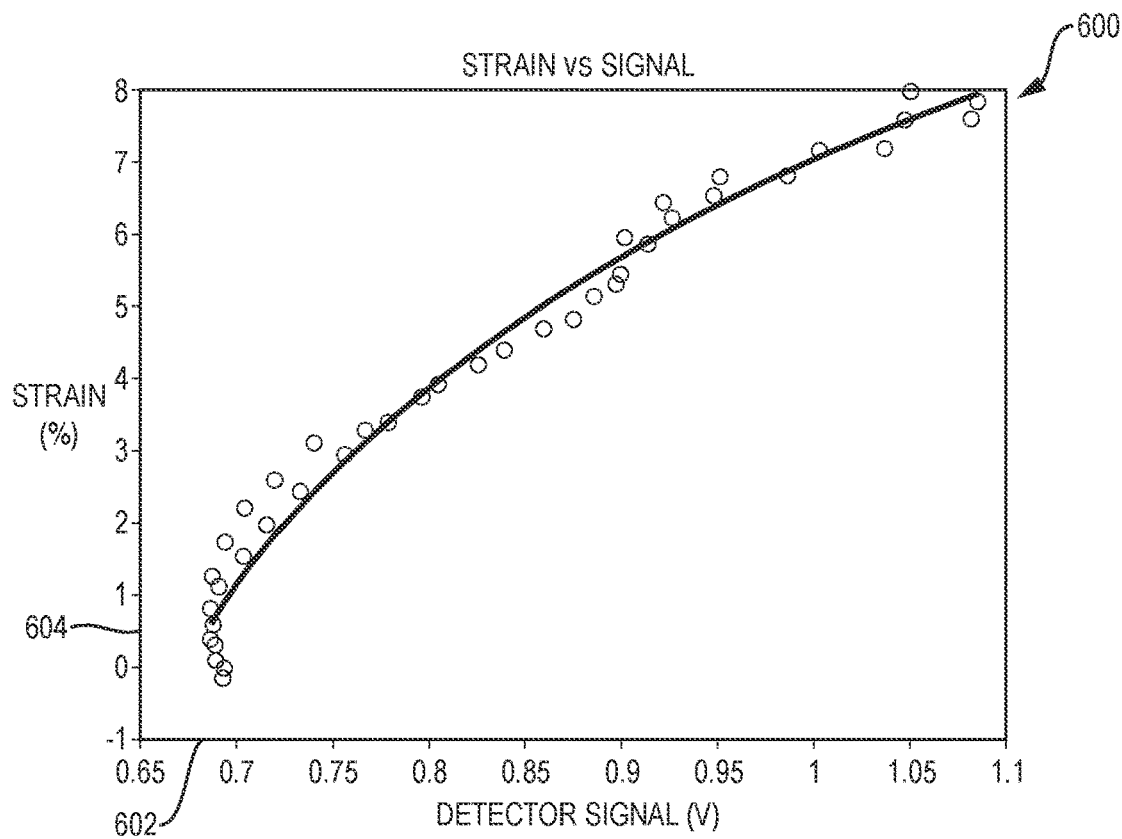
FIG. 6 shows a calibration graph of the sensor of FIGS. 1-5B.

FIG. 6 shows a calibration graph 600 of the sensor 100. A voltage based on the photodetector 115 is shown on horizontal axis 602. The vertical axis 604 shows a percentage of strain or deformation based on the distance 118. Prior to deployment, since the silicone cylinder is transparent, and while the sensor 100 is under the load, a camera can be used to measure its deformation and at the same time read the signal from the sensor. As shown in FIG. 6, a curve fitting characterizes sensor 100 behavior.

Figure 7:
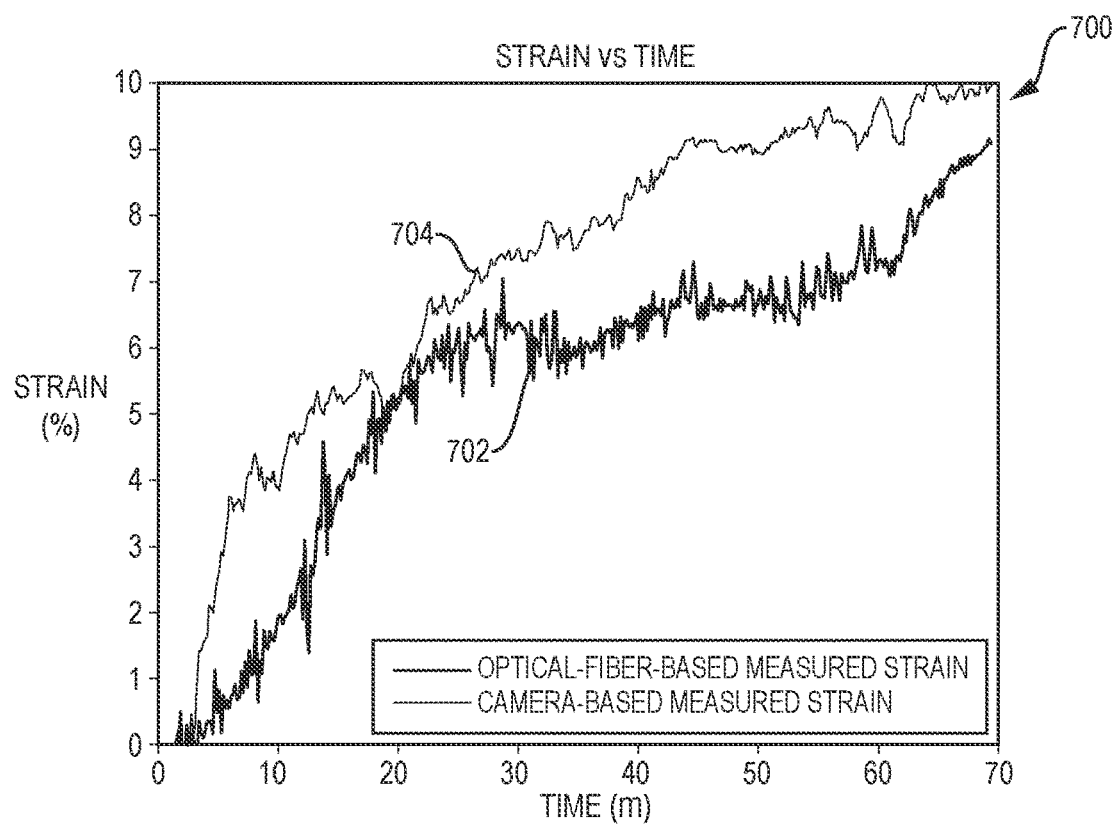
FIG. 7 compares camera data to sensed data from the deployed sensor of FIGS. 1-6.

FIG. 7 compares camera data to sensed data from the deployed sensor of FIGS. 1-6. Referring to FIGS. 1-7, a graph 700 shows validation of strain measurements from the sensor with camera-based strain measurements performed through image processing. Using the calibration data of FIG. 6, a measured strain 702 from the signal 116 of the sensor is calculated. Strain is measured from the sensor 100 and from camera-based measurements 704 which shows that the sensor measurements are reflecting the strain in the measured sample. The example in the test of FIG. 7 included shrinkage from a drying banana slice, as in a food preparation environment. It is noteworthy that while the sensor 100 measures strain inside the sample, the camera-based measurements perform calculations based on the change of the surface of the sample. In the drying process, shrinkage on the surface occurs earlier and of a greater magnitude than within the mass of the banana slice, where the sensor 100 is located. This underscores the benefit that the strain sensor 100 is capable of measuring strain inside samples, where camera-based and visual measurements may be limited.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. An optical fiber sensor device, comprising:
   an optical fiber disposed in proximity to a reflective surface;
   a photodetector for receiving an optical signal reflected from the reflective surface;
   a sensory medium engaged with the optical fiber and configured to dispose the optical fiber at a distance from the reflective surface based on a sensed force applied to the sensory medium; and
   an interface to a sensing circuit for computing a magnitude of the sensed force based on the reflected optical signal.

2. The device of claim 1 further comprising a sensing signal emitted from an optical signal generator and transmitted towards the reflective surface via the optical fiber.

3. The device of claim 2 wherein the optical fiber has an axis, the sensory medium disposing the axis substantially perpendicular to the reflective surface.

4. The device of claim 3 wherein the distance is based on a distal end of the optical fiber and the reflective surface, the sensing signal emitted from the distal end of the optical fiber.

5. The device of claim 1 wherein the optical fiber has a distal end, the distal end in proximity to the reflective surface, and a proximate end, the sensing circuit attached to the proximate end for receiving the reflected optical signal, the sensing circuit including instructions for computing a strain based on a magnitude of the optical signal.

6. The device of claim 1 further comprising a signal generator, the signal generator transmitting a sensing signal from a proximate end of the optical fiber to a distal end of the optical fiber, the sensing circuit attached to the optical fiber for receive the reflected optical signal.

7. The device of claim 2 further comprising a circulator, the circulator connected to the optical fiber, the circulator including:
   a source port for receiving the sensing signal and direct the sensing signal to a second port connected to the distal end,
   a sensory port for directing the sensing signal towards the reflective surface; and
   a measurement port for directing the reflected optical signal towards the sensing circuit.

8. The device of claim 1 further comprising a sensing receptacle, the sensing receptacle having translucent walls and adapted for slidable engagement with the optical fiber;
   the reflective surface disposed for intersection with an axis of the optical fiber; and
   the receptacle receiving a distal end of the optical fiber.

9. The device of claim 8 wherein the sensing receptacle further comprises:
   a transparent tube having an open end and a closed end;
   the reflective surface disposed at the closed end of the transparent tube; and
   the optical fiber inserted into the open end of the transparent tube to a predetermined distance.

10. The device of claim 1 wherein the sensory medium further comprises:
    a shaped volume of deformable material;
    a bore through the shaped volume, the bore sized for receiving the optical fiber;
    an attachment between the optical fiber along a portion of the received optical fiber; and
    a detached portion of the optical fiber within the bore, the detached portion defining a variable distance from a distal end of the optical fiber to the reflective surface.

11. The device of claim 1 further comprising a transparent sleeve inserted in the bore, the transparent sleeve surrounding the detached portion of the optical fiber.

12. The device of claim 1 wherein the reflective surface reflects a portion of light emitted from the optical fiber outside the transparent sleeve, and reflects a portion of light emitted from the optical fiber back into the optical fiber to the sensing circuit based on the distance.

13. A method for forming an optical sensor, comprising:
    attaching a transparent tube perpendicular to a reflective disk;
    inserting the transparent tube through a bore in a deformable material;
    inserting an optical fiber into the transparent tube extending through the bore and to a predetermined distance from the reflective disk; and
    adhering a portion of optical fiber to the bore, a portion of the optical fiber inserted into the bore remaining in slidable communication with an interior of the transparent tube.

14. The method of claim 13 further comprising attaching a circulator to a proximate end of the optical fiber opposite the distal end inserted into the transparent tube;
    attaching an optical source to a port of the circulator for communication with the distal end; and
    attaching a sensor circuit to a port of the circulator for receiving a reflected optical signal from the reflective surface.

15. The method of claim 13, further comprising:
    inserting the optical fiber through the bore;
    subsequently inserting and positioning the optical fiber in the transparent tube at a predetermined depth;
    after locating the distal end of the optical fiber at the predetermined depth in the transparent tube, applying an adhesive to the optical fiber at an entry location into the transparent tube, and
    sliding the bore and deformable material over the transparent tube at the entry location.

16. A strain gauge device, comprising
    a reflective base adapted to reflect a divergent optical signal;
    a glass tube attached to the reflective base for optical communication therewith, the glass tube having a working length;
    an optical fiber having a proximate end and a distal end, the optical fiber configured for transporting an optic signal, the optical fiber having an outside diameter smaller than an inside diameter of the glass tube; the proximate end disposed in slidable communication with an interior of the glass tube; and
    a resilient buffer concentrically disposed around the optical fiber and the glass tube, the buffer adhered to the glass tube and adhered to a portion of the optical fiber extending from the glass tube, wherein the buffer is nonrigid for accommodating measurement of deformation and mitigating response by the sensor to the deformation of a sensed medium;
    the resilient buffer configured to dispose in response to an external strain, the external strain resulting in an advancement or retraction of the proximate end within the working length, the advancement or retraction resulting in a change to the divergent optical signal reflected from the reflective base.

17. The device of claim 16 wherein the optical fiber employs a glued connection to the resilient buffer and has a tolerance for slidable communication within the inside diameter of the glass tube.

18. The device of claim 16 wherein the optical signals are indicative of a strain of a range of 0-20%, of a host object to which the resilient buffer is inserted or affixed.

19. The device of claim 16 wherein the resilient buffer is formed from silicone having a cylindrical shape and a bore therethrough for accommodating the glass tube.

20. The device of claim 1 wherein the reflective base is adapted for insertion into at least one of an object with large deformability, soft biological tissues and a food product.

* * * * *